US011409607B1

(12) United States Patent
Hung et al.

(10) Patent No.: US 11,409,607 B1
(45) Date of Patent: Aug. 9, 2022

(54) BASIC INPUT OUTPUT SYSTEM UPDATES

(71) Applicant: Hewlett-Packard Development Company, L.P., Spring, TX (US)

(72) Inventors: Ming Chang Hung, Taipei (TW); Heng-Fu Chang, Taipei (TW); Kang-Ning Feng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/374,081

(22) Filed: Jul. 13, 2021

(51) Int. Cl.
*G06F 11/00* (2006.01)
*G06F 11/14* (2006.01)
*G06F 11/07* (2006.01)
*G06F 9/4401* (2018.01)

(52) U.S. Cl.
CPC ........ *G06F 11/1433* (2013.01); *G06F 11/076* (2013.01); *G06F 11/1417* (2013.01); *G06F 9/4406* (2013.01); *G06F 11/0703* (2013.01); *G06F 2201/805* (2013.01)

(58) Field of Classification Search
CPC ............ G06F 11/1417; G06F 11/1433; G06F 11/0754; G06F 11/076; G06F 9/4406; G06F 8/65; G06F 8/66
See application file for complete search history.

(56) References Cited

U.S. PATENT DOCUMENTS

| | | | |
|---|---|---|---|
| 6,170,066 B1 | 1/2001 | See | |
| 6,584,559 B1* | 6/2003 | Huh | .......................... G06F 8/60 |
| | | | 713/1 |
| 6,822,901 B2 | 11/2004 | Kawamata | |
| 7,277,329 B2 | 10/2007 | Chen | |
| 8,239,664 B2* | 8/2012 | Wu | ...................... G06F 11/1417 |
| | | | 713/1 |
| 2007/0150645 A1 | 6/2007 | Chandramouli | |
| 2008/0141016 A1* | 6/2008 | Chang | ................. G06F 11/1433 |
| | | | 713/2 |
| 2010/0199078 A1* | 8/2010 | Shih | .......................... G06F 8/65 |
| | | | 717/173 |
| 2019/0369898 A1 | 12/2019 | Wynn | |
| 2020/0133654 A1* | 4/2020 | Lei | ............................. G06F 8/71 |
| 2020/0356357 A1* | 11/2020 | Narasimhan | .......... G06F 15/167 |
| 2021/0334087 A1* | 10/2021 | Wynn | ....................... G06F 1/24 |

* cited by examiner

*Primary Examiner* — Marc Duncan
(74) *Attorney, Agent, or Firm* — Brooks, Cameron & Heubsch PLLC

(57) ABSTRACT

Example implementations relate to Basic Input Output System updates. In some examples, a computing device can include a memory, a processor to, in response to completion of a Basic Input/Output System (BIOS) update, generate and store a boot status variable in the memory, determine whether the BIOS update was successful, in response to the BIOS update being successful, delete the boot status variable from the memory and perform a power event, and in response to the BIOS update being unsuccessful, perform a BIOS recovery.

14 Claims, 5 Drawing Sheets

BASIC INPUT OUTPUT SYSTEM UPDATES

BACKGROUND

A computing device can utilize a basic input/output system (BIOS) in order to initialize hardware of the computing device during a boot process of the computing device. Additionally, the BIOS can provide services for an operating system (OS) of the computing device.

DETAILED DESCRIPTION

Figure 1:
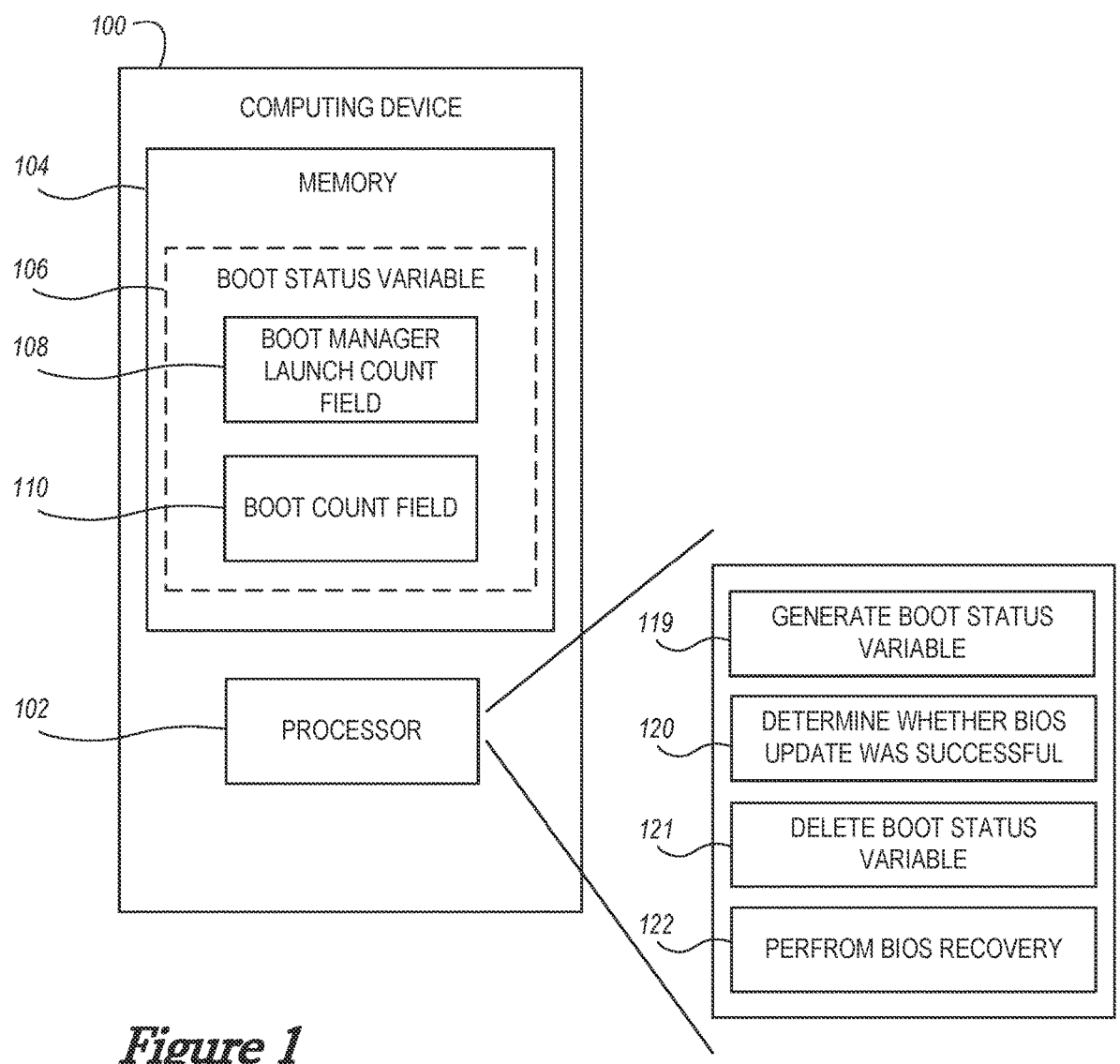
FIG. 1 illustrates an example of a computing device including a boot status variable for BIOS updates consistent with the disclosure.

A BIOS can be utilized by a computing device to perform hardware initialization during a boot process of the computing device. As used herein, a basic input/output system (BIOS) refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

A user may utilize a computing device for various purposes, such as for business and/or recreational use. As used herein, the term "computing device" refers to an electronic system having a processing resource, memory resource, and/or an application-specific integrated circuit (ASIC) that can process information. A computing device can be, for example, a laptop computer, a notebook, a desktop, a tablet, and/or a mobile device, among other types of computing devices.

In some instances, a BIOS of a computing device may be updated. For example, a new version of a BIOS may introduce security updates, patch bugs, provide support for additional hardware components associated with the computing device, etc. As a result, updating the BIOS can provide benefits, improvements, or combinations thereof regarding operation of the computing device.

In an instance in which an unexpected event occurs during the BIOS update process, delays in updating the BIOS may result. For example, if an unexpected event occurs to interrupt the BIOS update process, or if the BIOS update process completes but is unsuccessful, the BIOS update process may have to be performed again. This may result in additional time in which a user may not be able to utilize the computing device, which can result in a negative user experience.

A boot status variable can be utilized to perform a BIOS recovery when a BIOS update is unsuccessful or if the BIOS update is interrupted. The boot status variable can allow the computing device to determine when to perform a BIOS recovery and to reduce an amount of time to perform the BIOS recovery, resulting in a positive user experience while reducing servicing costs for a servicing provider to assist with BIOS updates as compared with previous approaches, as is further described herein.

FIG. 1 illustrates an example of a computing device 100 including a boot status variable 106 for BIOS updates consistent with the disclosure. As illustrated in FIG. 1, the computing device 100 can include a processor 102 and a memory 104.

As described above, a BIOS of a computing device 100 may be updated. Such updates may include security updates, patch bugs, provide support for additional hardware components associated with the computing device, etc., which can be useful for operation of the computing device 100.

When the computing device 100 is powered on, the computing device 100 can perform a boot sequence. As used herein, the term "boot sequence" refers to an order in which a computing device searches a data storage device including program code to load an OS. In some examples, a boot sequence can be as follows: the processor 102 can transition through a Security (SEC) phase, a Pre-EFI Initialization (PEI) phase, a Driver Execution Environment (DXE) phase, a Boot Device Selection (BDS) phase, or combinations thereof, among other boot phases. The SEC phase can include initialization code from a cold boot entry point on. The PEI phase can initialize the computing device 100 and provide an amount of memory for the DXE phase. The DXE phase can include loading drivers for devices, executing boot program instructions, etc. Following the boot sequence, the processor 102 can hand off control of the computing device 100 to the OS of the computing device 100 (e.g., via an OS boot manager) in an example in which there is no BIOS update pending. However, if a BIOS update is pending (e.g., a second version of the BIOS is to be installed to replace a first version), the processor 102 can prevent handing off control of the computing device 100 to the OS. Rather, a BIOS update process can take place, as is further described herein.

To perform a BIOS update from a first version to a second version, the processor 102 can generate and store a backup of the first version of the BIOS in the memory 104. Such a backup of the first version of the BIOS can be generated and stored prior to performing the BIOS update. To perform the BIOS update, the processor 102 can load the second version of the BIOS into the memory 104.

Although not illustrated in FIG. 1, the memory 104 can include an update status variable. As used herein, the term "update status variable" refers to a memory cell having a value relating to an update status of a BIOS update. The update status variable can be a non-volatile variable. For example, the update status variable can include a status field having a value relating to the update status of the BIOS update. The processor 102 can store, as a default value in the status field of the update status variable prior to performing the BIOS update, a fail status in the status field of the update status variable. Storing the fail status as the default status can allow the processor 102 to update the field status of the update status variable to a success status if the BIOS update is completed, but allow a BIOS recovery process to occur if the BIOS update is unsuccessful, is interrupted, etc., as is further described in connection with FIGS. 2 and 3. Further, the update status variable can store version information of the BIOS. For example, the update status variable can store a current version (e.g., a first version of the BIOS), and an attempted version (e.g., a second version of the BIOS).

The processor 102 can additionally generate and store, in the memory 104, a block index variable and a sector index variable as part of performing the BIOS update. As used herein, the term "block index variable" refers to a memory cell having a value relating to an address of a block in a storage medium. As used herein, the term "sector index variable" refers to a memory cell having a value relating to an address of a sector in a block in a storage medium. The block index variable and the sector index variable can be non-volatile variables. The block index variable can store an address of a block in the memory 104 at which the second version of the BIOS update is to be written, and the sector index variable can store an address of a sector within the block in the memory 104 at which the second version of the BIOS update is to be written. Storing the address of the block and sector at which the second version of the BIOS update is to be written can increase the speed at which the second version of the BIOS is re-written in an example in which the BIOS update process is interrupted, as is further described in connection with FIG. 3.

To perform the BIOS update, the processor 102 can write the second version of the BIOS beginning at the address of the block and the sector in the memory 104. For example, beginning at the address of the block in the block index variable and the address of the sector in the block in the sector index variable, the processor 102 can write the second version of the BIOS to the memory by issuing erase and program commands.

In some examples, the BIOS update process may be interrupted. For instance, a power failure may occur to cause the computing device 100 to power off, interrupting the BIOS update process. As another example, user intervention with the computing device 100 may cause the BIOS update process to be interrupted. In such an example, the processor 102 can perform a BIOS recovery process, as is further described in connection with FIG. 3.

Upon completion of the BIOS update, the processor 102 can update the status field of the update status variable. For example, when the BIOS update is completed, the processor 102 can update the update status of the BIOS update from the fail status to store a success status in the status field.

Additionally, upon completion of the BIOS update, the processor 102 can generate and store a boot status variable 106 in the memory 104 at 119. As used herein, the term "boot status variable" refers to a memory cell having a value relating to a boot status of a computing device. The boot status variable can be a non-volatile variable. As illustrated in FIG. 1, the boot status variable 106 can include a boot manager launch count field 108 and a boot count field 110. The boot manager launch count field 108 can be a value that counts an amount of times the BIOS attempts to hand over control to the OS boot manager, and the boot count field 110 can be a value that counts an amount of times the computing device 100 performs a power event, as is further described in connection with FIG. 2.

Since the boot status variable 106 is not always present in the memory 104 (e.g., generated by the processor 102 following completion of a BIOS update), the boot status variable 106 is illustrated in FIG. 1 with a dashed line.

The processor 102 can determine whether the BIOS update was successful at 120. For example, the processor 102 can determine the BIOS update was successful in response to the success status being stored in the status field of the update status variable.

In response to the BIOS update being successful, the processor 102 can delete the delete the block index variable and the sector index variable from the memory 104. The processor 102 can cause a power event to occur. As used herein, the term "power event" refers to a change in power status of a computing device. For example, a power event may include rebooting the computing device 100, causing a hibernation or other low power state to occur (e.g., S1, S2, S3, S4, S5, S0 low-power idle, or combinations thereof), powering off the computing device 100, or combinations thereof.

In some examples, the processor 102 can cause the computing device 100 to perform the power event by rebooting the computing device 100. Following the power event, the processor 102 can again perform the boot sequence. Since no BIOS update is now pending (e.g., the second version of the BIOS was installed), the processor 102 can hand off control of the OS to the OS boot manager. Finally, in response to the BIOS update being successful, the processor 102 can delete the boot status variable from the memory 104 at 121.

In some examples, the BIOS update may be unsuccessful. For example, the BIOS update may become corrupted, install incorrectly, etc. In such an example, when control of the OS is handed off to the OS boot manager, the OS may not operate correctly. In such an example, the processor 102 can perform a BIOS recovery process, as is further described in connection with FIG. 2.

Figure 2:
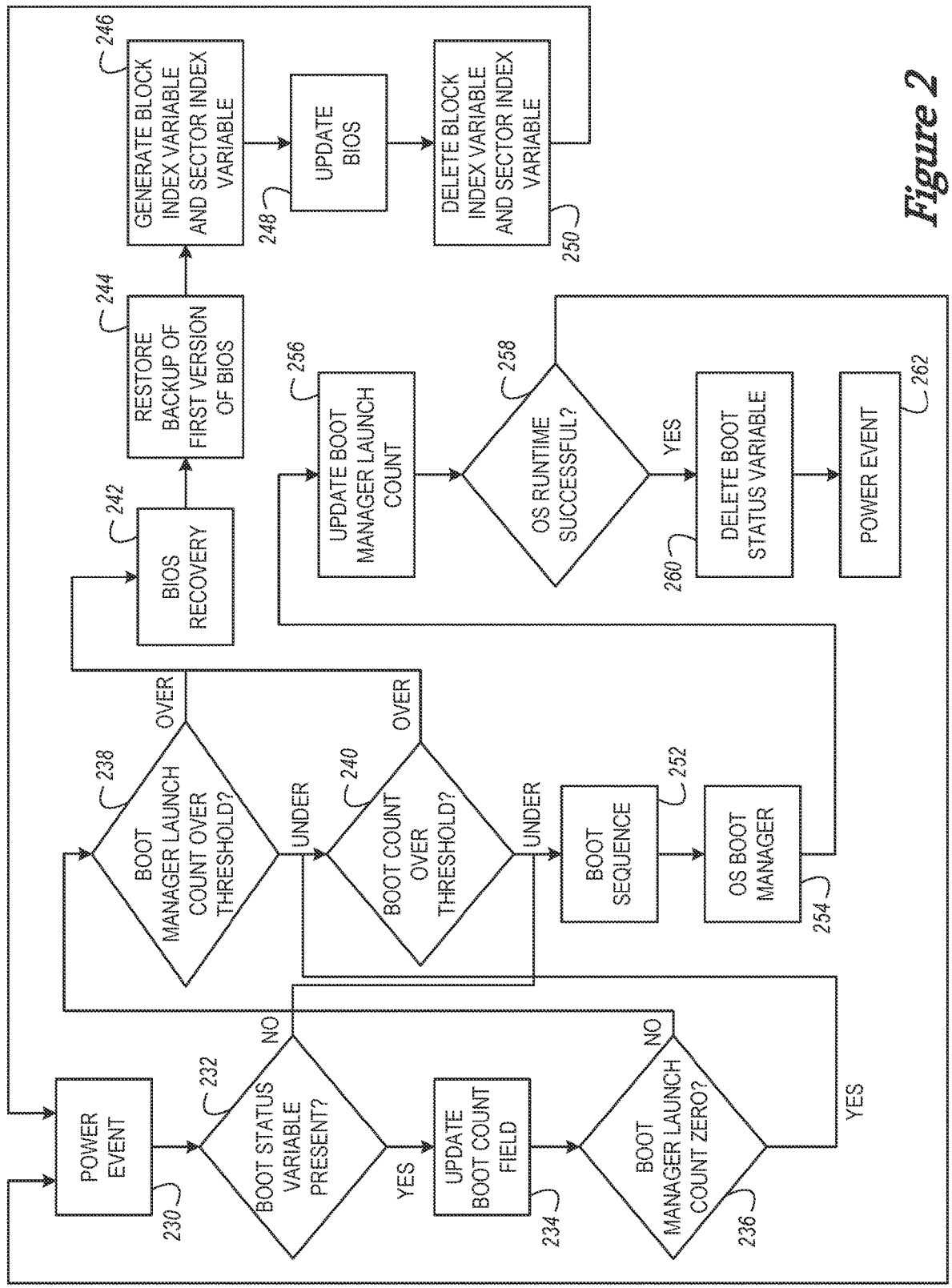
FIG. 2 illustrates an example flow chart for BIOS updates consistent with the disclosure.

FIG. 2 illustrates an example flow chart for BIOS updates consistent with the disclosure. In an example in which the BIOS update is completed but not successful, the processor can perform a BIOS recovery, as is further described herein.

As previously described in connection with FIG. 1, in response to completion of a BIOS update, the processor can generate and store a boot status variable in the memory of the computing device. Generating the boot status variable can include initializing a boot manager launch count field of the boot status variable to zero. As used herein, the term "boot manager launch count field" refers to a value stored in the boot status variable that counts an amount of times the BIOS attempts to hand over control of the OS to the OS boot manager. Additionally, generating the boot status variable can include initializing a boot count field of the boot status variable to zero. As used herein, the term "boot count field" refers to a value stored in the boot status variable that counts an amount of times the computing device performs a power event. Accordingly, the boot manager launch count field and the boot count field can be counters stored in the boot status variable that can increase in count each time a BIOS attempts to hand over control of the OS to the OS boot manager and each time the computing device performs a power event, respectively.

Upon completion of the BIOS update, the processor can determine whether the BIOS update was successful. For example, after deleting the block index variable and the sector index variable (e.g., as previously described in connection with FIG. 1), the processor can cause a power event to occur at 230.

In the example described in connection with FIG. 1, upon successful handoff of control of the computing device to the OS, the processor can delete the boot status variable. Accordingly, at 232, the processor can determine whether the boot status variable is present. In response to the boot status variable not being present, the processor can perform the boot sequence at 252. However, in response to the boot status variable being present, the processor, at 234, can update the boot count field from a value of zero to one. Since the boot status variable is deleted from the memory of the computing device in response to a successful BIOS update, the boot status variable being present can be an indication that the BIOS update may not have been successful, as is further described herein.

At 236, the processor can determine whether the boot manager launch count is zero. In response to the boot manager launch count being zero, the processor can determine, at 240, whether the boot count field is over a second threshold. In some examples, the second threshold may be 10. The processor can determine the boot count field is zero. Accordingly, when the boot manager launch count is zero and the boot count field is under the second threshold, the processor can cause the boot sequence to occur at 252, hand off control of the OS to the OS boot manager at 254, update the boot manager launch count (e.g., to one) at 256. If, at 258, the OS does run successfully, the processor can delete the boot status variable at 260 and perform a power event at 262. However, if, at 258, the OS does not run successfully, the processor can cause the power event 230 to occur again.

In another example in which the boot manager launch count is zero, the processor can determine whether the boot count field is over the second threshold. For example, the processor can determine the boot count field is 12 (e.g., exceeding the second threshold of 10). In such an instance, the processor can perform the bios recovery at 242. In such an example, the computing device may be constantly performing power events during a pre-boot environment (POST), which may be the result of a BIOS update causing the OS to not launch correctly.

Following the power event 230 after the OS does not run successfully at 258, the processor can check whether the boot status variable is present at 232, and if yes, update the boot count field (e.g., to one) at 234. If the boot manager launch count is not zero (e.g., one), the processor can determine whether the boot manager launch count field exceeds a first threshold at 238. In response to the boot manager launch count not exceeding the first threshold, the processor can determine, at 240 whether the boot count is over the second threshold. In response to the boot manager launch count being not zero and the boot manager launch count not exceeding the first threshold, the processor can determine whether the boot count is over the second threshold at 240. If the boot manager launch count is not zero but the boot manager launch count does not exceed the first threshold and the boot count field does not exceed the second threshold, the processor can cause the boot sequence to occur at 252, hand off control of the OS to the OS boot manager at 254, update the boot manager launch count (e.g., to one) at 256. If, at 258, the OS does run successfully, the processor can delete the boot status variable at 260 and perform a power event at 262. However, if, at 258, the OS does not run successfully, the processor can cause the power event 230 to occur again. If the boot manager launch count is not zero and the boot manager launch count does exceed the first threshold, the processor can perform the bios recovery at 242 in response to the boot manager launch count exceeding the first threshold. If the boot manager launch count is not zero but the boot manager launch count does not exceed the first threshold and the boot count does exceed the second threshold, the processor can cause the BIOS recovery to occur at 242.

Utilizing the boot status variable can track the amount of times the computing device has performed a power event as well as an amount of times the BIOS attempts to hand over control to the OS boot manager. In an instance in which the computing device has performed a number of power events that exceeds a threshold, in an event in which the BIOS unsuccessfully attempts to hand over control of the OS to the boot manager, or combinations thereof, the processor can utilize the boot status variable to cause a BIOS recovery to occur.

In order to perform the BIOS recovery 242, the processor restore the backup of the first version of the BIOS at 244. For example, the processor can load the first version of the BIOS into the memory from the backup BIOS image (e.g., created before attempting to perform the BIOS update from the first version to the second version, previously described in connection with FIG. 1). The processor can perform a boot sequence including a DXE phase from the first version of the BIOS, a BDS phase from the first version of the BIOS, as well as other phases of the boot sequence. Additionally, the processor can generate an error message and cause the error message to be displayed on a user interface of a display to notify a user that the BIOS recovery is being performed.

At 246, the processor can generate the block index variable and the sector index variable storing an address of a block in the memory and a sector in the block in the memory where the subsequent version of the BIOS is to be written. Since the block index variable and the sector index variable were deleted after the first attempted BIOS update (e.g., as previously described in connection with FIG. 1), the processor has to generate the block index variable and the sector index variable again. At 248, the processor can update the BIOS by writing the second version of the BIOS by issuing erase and write commands. When the BIOS update is complete, the processor at 250 can again delete the block index variable and the sector index variable. Additionally, when the BIOS update is complete, the processor can reset the boot manager launch count field to zero and the boot count field to zero of the boot status variable. The processor can then cause the power event at 230 to occur.

The processor can again determine whether the boot status variable is present at 232 and, if so, update the boot count field at 234 (e.g., to one). At 236, the processor can determine whether the boot manager launch count is zero. If yes, the processor can determine, at 240, whether the boot count is over the second threshold. If not, the processor can cause the boot sequence to occur at 252, hand off control of the computing device to the OS boot manager 254, and update the boot manager launch count at 256. If the re-installed second version of the BIOS during the BIOS recovery is successful and OS runtime is successful at 258, the processor can delete the boot status variable at 260, and perform a power event at 262, finalizing the BIOS recovery.

Figure 3:
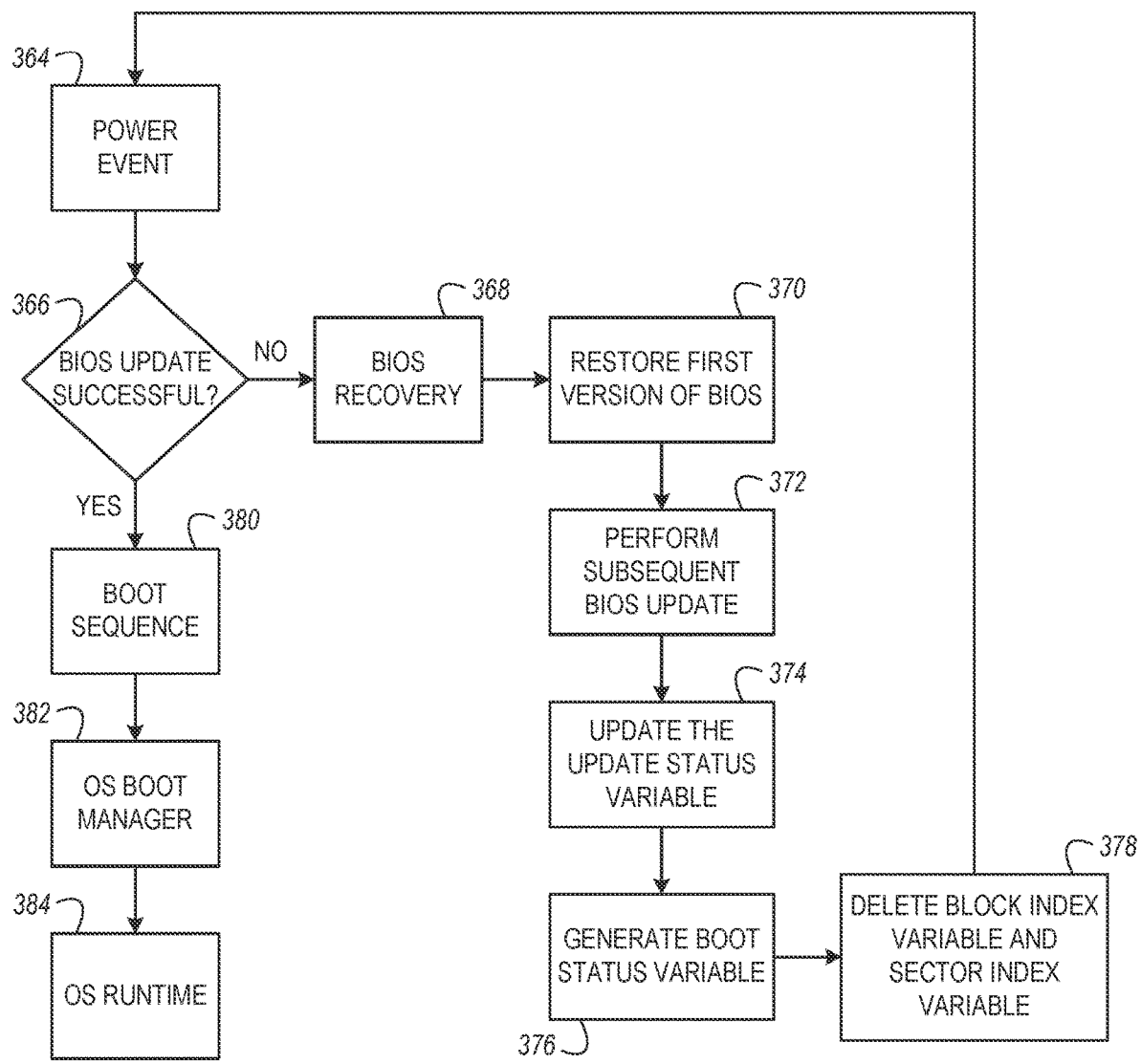
FIG. 3 illustrates an example flow chart for BIOS updates consistent with the disclosure.

FIG. 3 illustrates an example flow chart for BIOS updates consistent with the disclosure. In an example in which the BIOS update is not completed, the processor can perform a BIOS recovery, as is further described herein.

As previously described in connection with FIG. 1, the processor can generate and store a backup of the first version of the BIOS in the memory of the computing device. Such a backup of the first version of the BIOS can be generated and stored prior to performing the BIOS update. Additionally, the processor can store, as a default value in a status field of an update status variable prior to performing the BIOS update, a fail status.

As part of performing the BIOS update, the processor can generate and store in the memory of the computing device, a block index variable to store an address of a block in the memory and a sector index variable to store an address of a sector in the block at which the second version of the BIOS update is to be written. To begin the BIOS update, the processor can begin to write the BIOS update beginning at the address of the block and the sector in the memory.

In an example in which the BIOS update process is interrupted, the BIOS update may not be completed. For example, a power failure during the BIOS update may cause the computing device to power off, and as a result the BIOS update may not complete.

In such an example, the computing device can perform a power event at 364. For instance, the computing device may be powered back on after a power failure. The processor can, at 366, determine whether the BIOS update was successful. The processor can determine the BIOS update was not successful by checking the status field of the update status variable. Since the BIOS update did not complete, the status field of the status update variable can still include a fail status. Accordingly, the processor can determine the BIOS update was not completed in response to the fail status being stored in the status field of the update status variable.

At 368, the processor can perform a BIOS recovery in response to the BIOS update not being completed. In order to perform the BIOS recovery, the processor restore the backup of the first version of the BIOS at 370. For example, the processor can load the first version of the BIOS into the memory from the backup BIOS image (e.g., created before attempting to perform the BIOS update from the first version to the second version, previously described in connection with FIG. 1). The processor can perform a boot sequence including a DXE phase from the first version of the BIOS, a BDS phase from the first version of the BIOS, as well as other phases of the boot sequence. Additionally, the processor can generate an error message and cause the error message to be displayed on a user interface of a display to notify a user that the BIOS recovery is being performed.

As mentioned above, the processor can store the address of the block in the memory at which the BIOS update is to be written and the address of the sector in the block in the memory at which the BIOS update is to be written. To reduce an amount of time taken to perform a subsequent BIOS update in an event of an interruption in the BIOS update, the processor can utilize the address of the block and the sector in the block. For example, the processor can determine a recovery start point utilizing the address of the block and the address of the sector in the block. At 372, the processor can perform a subsequent BIOS update by writing the second version of the BIOS beginning at the address of the block in the block index variable and the address of the sector in the sector index variable by issuing erase and write commands.

When the subsequent BIOS update is complete, the processor can, at 374, update the update status variable. For example, the processor can update the update status variable from a fail status to a success status. Updating the update status of the update status variable can signal, upon a power event, that the subsequent BIOS update was completed (e.g., and not interrupted). In the event of an interruption of the subsequent BIOS update, the processor can repeat the process above.

Additionally, when the subsequent BIOS update is complete, the processor can, at 376, generate a boot status variable. As previously described in connection with FIG. 2, the boot status variable can be utilized in the event that the subsequent BIOS update is completed but not successful.

At 378, the processor can delete the block index variable and the sector index variable from the memory of the computing device. The processor can then, at 364, cause a power event to occur. At 366, the processor can determine whether the subsequent BIOS update was successful by checking the update status of the update status variable. For example, the processor can determine, based on the update status variable having a success status, the subsequent BIOS update was successful. In response to the subsequent BIOS update being successful, the processor can delete the boot status variable from the memory.

Accordingly, at 380, the processor can cause the computing device to begin a boot sequence, including a DXE phase, a BDS phase, among other boot sequence phases. The processor can hand off control of the computing device to the OS boot manager at 382, and if OS runtime is successful at 384, the BIOS update process is complete.

BIOS updates according to the disclosure can allow the computing device to easily recover from unsuccessful BIOS updates or interruption of BIOS updates by performing a BIOS recovery process. By performing the BIOS recovery process, an amount of time to perform BIOS recovery operations can be reduced, resulting in a positive user experience as compared with previous approaches.

Figure 4:
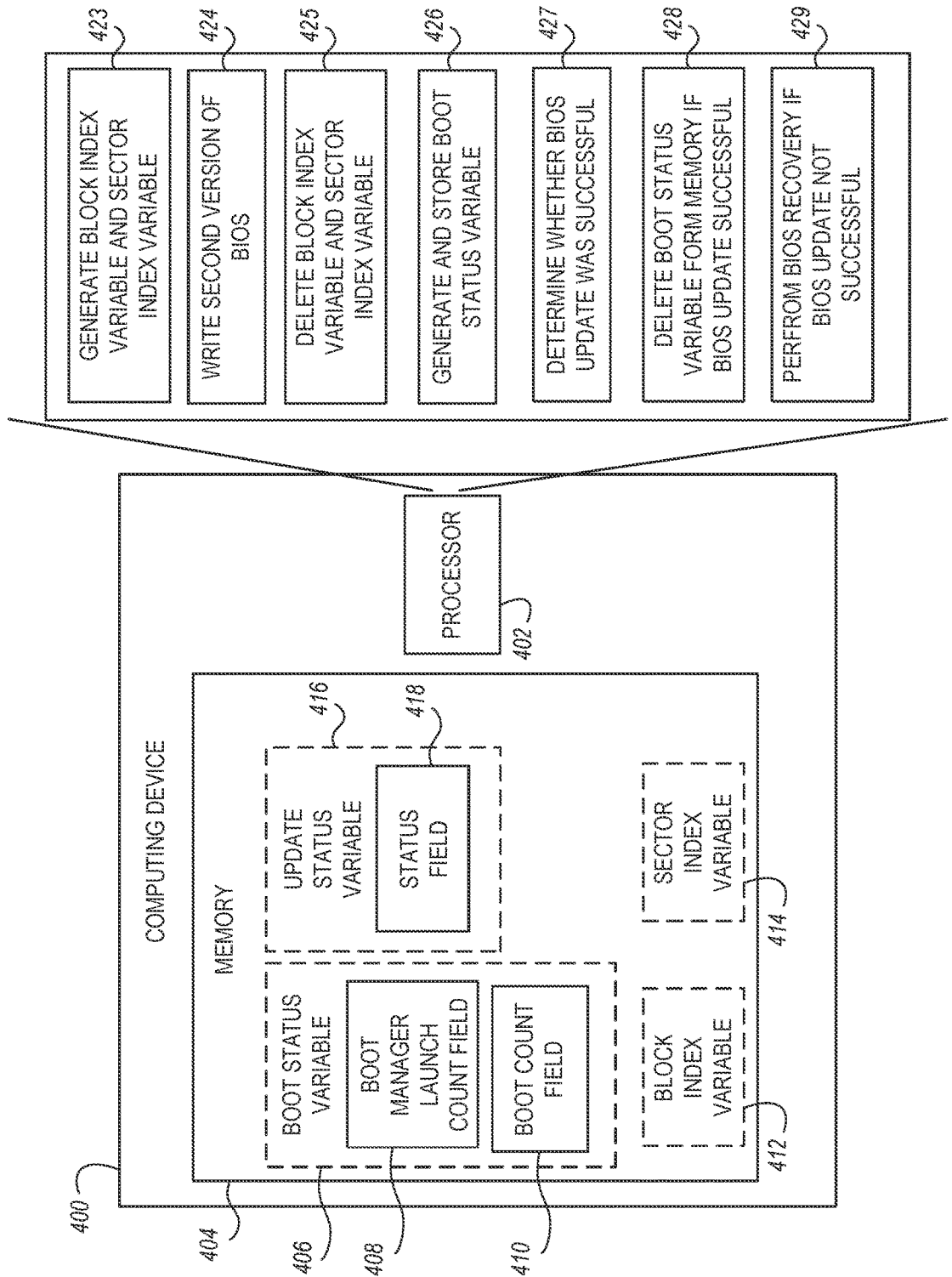
FIG. 4 illustrates an example of a computing device including a boot status variable for BIOS updates consistent with the disclosure.

FIG. 4 illustrates an example of a computing device 400 including a boot status variable 406 for BIOS updates consistent with the disclosure. As illustrated in FIG. 1, the computing device 400 can include a processor 402 and a memory 404.

As illustrated in FIG. 4, the memory 404 can store, in some instances, a boot status variable 406, an update status variable 416, a block index variable 412, and a sector index variable 414. As such variables 406, 412, 414, and 416 are not always present in the memory 404, such variables 406, 412, 414, and 416 are shown with dashed lines.

The boot status variable 406 can include a boot manager launch count field 408 and a boot count field 410. Further, the update status variable 416 can include a status field 418. The boot status variable 406, the block index variable 412, the sector index variable 414, and the update status variable 416 can be non-volatile variables.

As previously described in connection with FIGS. 1-3, the processor 402 of the computing device 400 can update a BIOS of the computing device 400 from a first version to a second version. To perform the BIOS update, the processor 402 can, at 423, generate and store, in the memory 404, the block index variable 412 and the sector index variable 414. The block index variable 412 can store an address of a block in the memory 404 and the sector index variable 414 can store an address of a sector in the block at which the second version of the BIOS update is to be written. Further, to perform the BIOS update, the processor 402 can, at 424, write the second version of the BIOS to the memory 404 beginning at the address of the block and the sector.

If the BIOS update is not completed, the processor 402 can perform a BIOS recovery process, as previously described in connection with FIG. 3. In response to the BIOS update being completed, the processor 402 can, at 425, delete the block index variable 412 and the sector index variable 414 from the memory 404. Additionally, the processor 402 can, at 426, generate and store the boot status variable 406 in the memory 404.

At 427, the processor 402 can determine whether the BIOS update was successful. The processor 402 can determine whether the BIOS update was successful based on the status field 418 of the update status variable 416. In response to the BIOS update being successful, the processor 402 can, at 428, delete the boot status variable from memory and perform a power event. In response to the BIOS update not being successful, the processor 402 can perform the BIOS recovery at 429.

Figure 5:
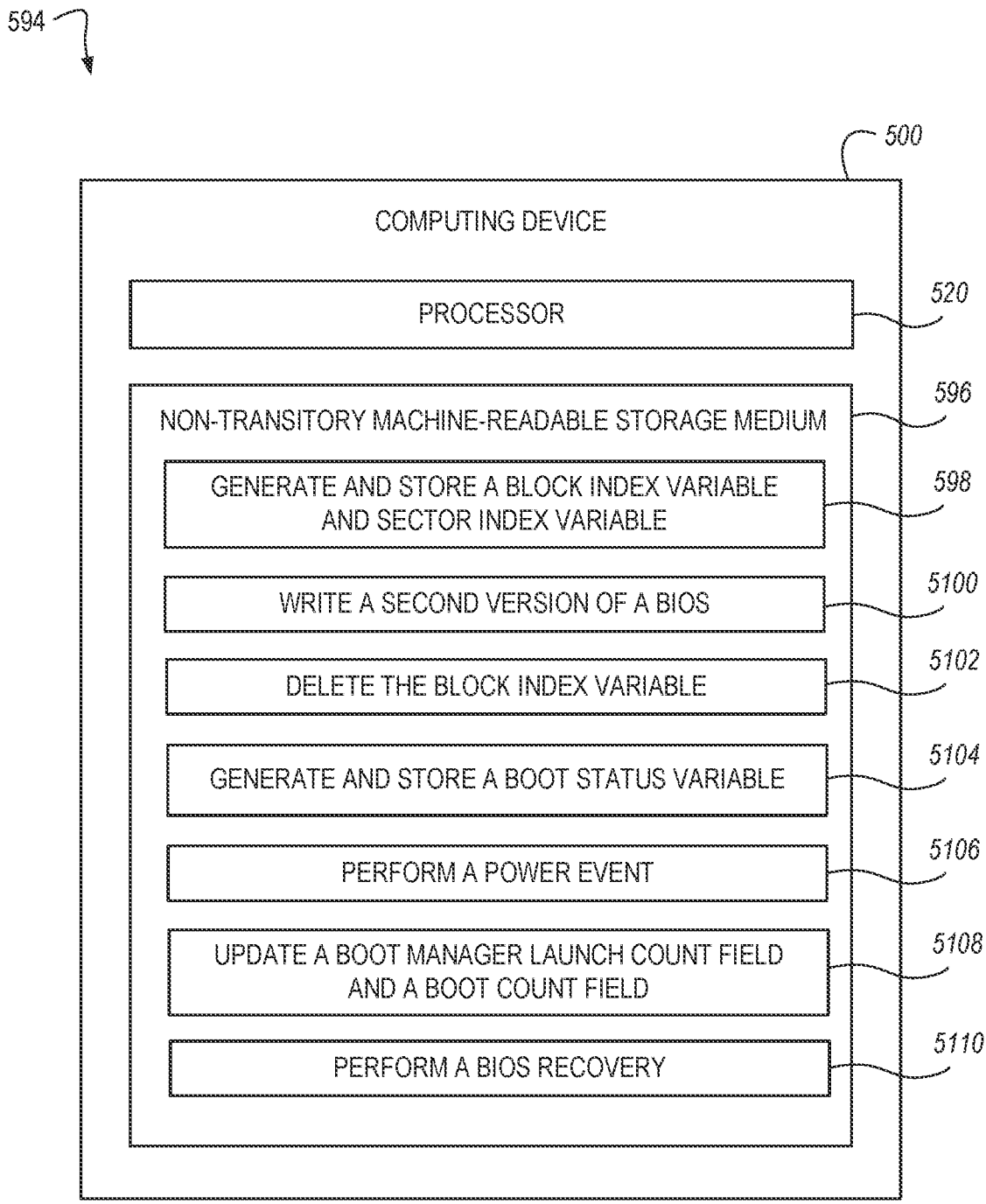
FIG. 5 illustrates a block diagram of an example system for BIOS updates consistent with the disclosure.

FIG. 5 illustrates a block diagram of an example system 594 for BIOS updates consistent with the disclosure. In the example of FIG. 5, system 594 includes a processor 502 and a non-transitory machine-readable storage medium 596. Although not illustrated in FIG. 5, the computing device 500 can include a processing resource. The following descriptions refer to a single processing resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

The processor 502 of the computing device 500 may be a central processing unit (CPU), microprocessor, and/or other hardware device suitable for retrieval and execution of instructions stored in a non-transitory machine-readable storage medium 596. In the particular example shown in FIG. 5, the processor 502 of the computing device 500 may receive, determine, and send instructions 598, 5100, 5102, 5104, 5106, 5108, 5110. As an alternative or in addition to retrieving and executing instructions, the processor 502 of the computing device 500 may include an electronic circuit comprising a number of electronic components for performing the operations of the instructions in the non-transitory machine-readable storage medium 596. With respect to the executable instruction representations or boxes described and shown herein, it should be understood that part or all of the executable instructions and/or electronic circuits included within one box may be included in a different box shown in the figures or in a different box not shown.

The non-transitory machine-readable storage medium 596 may be any electronic, magnetic, optical, or other physical storage device that stores executable instructions. Thus, the non-transitory machine-readable storage medium 596 may be, for example, Random Access Memory (RAM), an Electrically-Erasable Programmable Read-Only Memory (EE-PROM), a storage drive, an optical disc, and the like. The executable instructions may be "installed" on the system 594 illustrated in FIG. 5. The non-transitory machine-readable storage medium 596 may be a portable, external or remote storage medium, for example, that allows the system 594 to download the instructions from the portable/external/remote storage medium. In this situation, the executable instructions may be part of an "installation package".

Generate instructions 598, when executed by processor 502 of the computing device 500, may cause system 594 to generate and store a block index variable and a sector index variable. For example, the processor 502 can perform a BIOS update from a first version to a second version by generating and storing the block index variable and the sector index variable. The block index variable can store an address of a block in memory and the sector index variable can store an address of a sector in the block at which the second version of the BIOS update is to be written.

Write instructions 5100, when executed by processor 502 of the computing device 500, may cause system 594 to perform the BIOS update by writing the second version of the BIOS beginning at the address of the block and the sector. In response to the BIOS update not being completed, the processor 502 can perform a BIOS recovery.

Delete instructions 5102, when executed by processor 502 of the computing device 500, may cause system 594 to delete the block index variable and the sector index variable from the memory in response to the BIOS update being completed.

Generate instructions 5104, when executed by processor 502 of the computing device 500, may cause system 594 to generate and store a boot status variable in the storage medium 596 in response to the BIOS update being completed. The boot status variable can include a boot manager launch count field and a boot count field.

Perform instructions 5106, when executed by processor 502 of the computing device 500, may cause system 594 to perform a power event. The power event can include, for instance, rebooting the computing device 500.

Update instructions 5108, when executed by processor 502 of the computing device 500, may cause system 594 to update, in response to the boot status variable being present after the power event, the boot manager launch count field and the boot count field.

Perform instructions 5110, when executed by processor 502 of the computing device 500, may cause system 594 to perform a BIOS recovery based on the boot manager launch count field and the boot count field. For example, if the boot manager launch count does not exceed a first threshold and the boot count does not exceed a second threshold, the processor 502 is to perform a boot sequence and not a BIOS recovery. If the boot manager launch count does exceed the first threshold, perform the BIOS recovery. If the boot manager launch count does not exceed the first threshold and the boot count does exceed the second threshold, perform the BIOS recovery.

In the foregoing detailed description of the disclosure, reference is made to the accompanying drawings that form a part hereof, and in which is shown by way of illustration how examples of the disclosure may be practiced. These examples are described in detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. Similar elements or components between different figures may be identified by the use of similar digits. For example, 102 may reference element "02" in FIG. 1, and a similar element may be referenced as 402 in FIG. 4.

Elements illustrated in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense. As used herein, "a plurality of" an element and/or feature can refer to more than one of such elements and/or features.

What is claimed is:

1. A computing device, comprising:
    a memory; and
    a processor, wherein the processor is to:
        in response to a completion of a Basic Input/Output System (BIOS) update:
            generate and store a boot status variable in the memory, wherein generating the boot status variable includes initializing a boot manager launch count field of the boot status variable to zero and initializing a boot count field of the boot status variable to zero;
            determine whether the BIOS update was successful;
            in response to the BIOS update being successful, delete the boot status variable from the memory and perform a power event; and
            in response to the BIOS update being unsuccessful, perform a BIOS recovery.

2. The computing device of claim 1, wherein in response to the BIOS update being completed, the processor is to determine whether the boot manager launch count field exceeds a first threshold.

3. The computing device of claim 2, wherein the processor is to:
    in response to the boot manager launch count exceeding the first threshold, perform the BIOS recovery; and
    in response to the boot manager launch count not exceeding the first threshold, determine whether the boot count field exceeds a second threshold.

4. The computing device of claim 3, wherein the processor is to:
    in response to the boot count field exceeding the second threshold, perform the BIOS recovery; and
    in response to the boot count field not exceeding the second threshold, delete the boot status variable from the memory and perform the power event.

5. The computing device of claim 1, wherein:
    performing the BIOS update includes storing a fail status in a status field of an update status variable; and
    in response to the BIOS update being completed, the processor is to update the status field of the update status variable by storing a success status in the status field.

6. The computing device of claim 5, wherein the processor is to:
    determine the BIOS update was successful in response to the success status being stored in the status field of the update status variable; and
    determine the BIOS update was not completed in response to the fail status being stored in the status field of the update status variable.

7. A computing device, comprising:
    a memory; and
    a processor, wherein the processor is to:
        perform a Basic Input/Output System (BIOS) update from a first version to a second version by:
            generating and storing, in the memory, a block index variable to store an address of a block in the memory and a sector index variable to store an address of a sector in the block at which the second version of the BIOS update is to be written; and
            writing the second version of the BIOS beginning at the address of the block and the sector;
        in response to the BIOS update being completed:
            delete the block index variable and the sector index variable from the memory;
            generate and store a boot status variable in the memory;
            determine whether the BIOS update was successful;
            in response to the BIOS update being successful, delete the boot status variable from the memory and perform a power event; and
            in response to the BIOS update not being completed, perform the BIOS recovery.

8. The computing device of claim 7, wherein the processor is to generate and store a backup of the first version of the BIOS in the memory prior to performing the BIOS update.

9. The computing device of claim 8, wherein performing the BIOS recovery includes:
    restoring the backup of the first version of the BIOS; and
    performing a subsequent BIOS update by writing the second version of the BIOS beginning at the address of the block in the block index variable and the address of the sector in the sector index variable.

10. The computing device of claim 9, wherein in response to the subsequent BIOS update being completed, the processor is to:
    generate and store the boot status variable in the memory; and
    delete the block index variable and the sector index variable from the memory.

11. The computing device of claim 10, wherein the processor is to:
    determine whether the subsequent BIOS update was successful; and
    in response to the subsequent BIOS update being successful, delete the boot status variable from the memory and perform a power event.

12. A non-transitory machine-readable storage medium including instructions that when executed cause a processor of a computing device to:
    perform a Basic Input/Output System (BIOS) update from a first version to a second version by:
        generating and storing, in the storage medium, a block index variable to store an address of a block in the storage medium and a sector index variable to store an address of a sector in the block at which the second version of the BIOS update is to be written; and
        writing the second version of the BIOS beginning at the address of the block and the sector;
    in response to the BIOS update being completed:
        delete the block index variable and the sector index variable from the storage medium;
        generate and store a boot status variable in the storage medium, wherein the boot status variable includes a boot manager launch count field and a boot count field;
        perform a power event;
        in response to the boot status variable being present after the power event, update the boot manager launch count field and the boot count field; and
        perform a BIOS recovery based on the boot manager launch count field and the boot count field.

13. The non-transitory storage medium of claim 12, including instructions to perform the power event by rebooting the computing device.

14. The non-transitory storage medium of claim 12, wherein the block index variable, the sector index variable, and the boot status variable are non-volatile variables.

* * * * *